United States Patent
Xiao et al.

(10) Patent No.: US 11,126,739 B2
(45) Date of Patent: Sep. 21, 2021

(54) INVOICE ACCESS METHOD AND APPARATUS BASED ON BLOCKCHAIN, AND ELECTRONIC DEVICE

(71) Applicant: Advanced New Technologies Co., Ltd., Grand Cayman (KY)

(72) Inventors: Hansong Xiao, Zhejiang (CN); Ping Zhang, Zhejiang (CN); Wenhu Kan, Zhejiang (CN); Qin Liu, Zhejiang (CN); Liangrong Lin, Zhejiang (CN); Fuxi Deng, Zhejiang (CN); Yixiang Zhang, Zhejiang (CN); Rui Chen, Zhejiang (CN); Jinming Duan, Zhejiang (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/160,254

(22) Filed: Jan. 27, 2021

(65) Prior Publication Data
US 2021/0150046 A1 May 20, 2021

Related U.S. Application Data (63) Continuation of application No. PCT/CN2019/114308, filed on Oct. 30, 2019.

(30) Foreign Application Priority Data

Dec. 12, 2018 (CN) .......................... 201811519422.4

(51) Int. Cl.
G06F 21/62 (2013.01)
G06F 21/71 (2013.01)
(Continued)

(52) U.S. Cl.
CPC ........ *G06F 21/6218* (2013.01); *G06F 21/602* (2013.01); *H04L 9/0618* (2013.01); *H04L 9/08* (2013.01); *H04L 2209/38* (2013.01)

(58) Field of Classification Search
None
See application file for complete search history.

(56) References Cited

U.S. PATENT DOCUMENTS 10,380,685 B1 * 8/2019 Phillips ................. H04L 9/3247
10,764,752 B1   9/2020 Avetisov et al.
(Continued)

FOREIGN PATENT DOCUMENTS

CN   105610578 A   5/2016
CN   106920098 A   7/2017
(Continued)

OTHER PUBLICATIONS

A Blockchain-based Approach for Data Accountability and Provenance Tracking. Neisse. ARES. (Year: 2017).*
(Continued)

*Primary Examiner* — Venkat Perungavoor
(74) *Attorney, Agent, or Firm* — Seed IP Law Group LLP (57) ABSTRACT

One or more implementations of the present specification provide an invoice access method and apparatus based on a blockchain, and an electronic device. The method includes: receiving an access request initiated by an access user for a target invoice by using a client, the target invoice being encrypted and stored in the blockchain; determining, in response to the access request, whether the access user has an authority to access the target invoice; and in response to that the access user has the authority to access the target invoice, invoking decryption logic provided in a predetermined smart contract to decrypt ciphertext data of the target
(Continued)

invoice stored in the blockchain, and returning decrypted plaintext data of the target invoice to the client.

18 Claims, 5 Drawing Sheets

(51) Int. Cl.
*H04L 9/06* (2006.01)
*H04L 9/08* (2006.01)
*G06F 21/60* (2013.01)
*G06F 21/64* (2013.01)

(56) References Cited

U.S. PATENT DOCUMENTS

| | | | |
|---|---|---|---|
| 10,826,878 B2* | 11/2020 | Cox | H04L 63/06 |
| 2005/0071274 A1 | 3/2005 | Pfaff et al. | |
| 2007/0156535 A1 | 7/2007 | Hoffmann et al. | |
| 2008/0092239 A1 | 4/2008 | Sitrick et al. | |
| 2017/0148021 A1 | 5/2017 | Goldstein et al. | |
| 2018/0268382 A1 | 9/2018 | Wasserman | |
| 2018/0341910 A1 | 11/2018 | Broveleit | |
| 2018/0365686 A1 | 12/2018 | Kondo | |
| 2019/0098013 A1* | 3/2019 | Wilkinson | H04L 9/0643 |
| 2019/0260575 A1* | 8/2019 | Nenov | H04L 9/0894 |
| 2019/0392536 A1 | 12/2019 | Rice | |
| 2020/0027089 A1 | 1/2020 | Kuchar et al. | |
| 2020/0097967 A1 | 3/2020 | Patel et al. | |
| 2020/0118207 A1* | 4/2020 | Jovanovic | G06Q 20/102 |
| 2020/0177604 A1* | 6/2020 | Wei | H04L 63/0442 |
| 2020/0402025 A1* | 12/2020 | Wang | H04L 9/0637 |
| 2021/0014060 A1* | 1/2021 | Georgiadis | H04L 9/085 |

FOREIGN PATENT DOCUMENTS

| | | |
|---|---|---|
| CN | 106920169 A | 7/2017 |
| CN | 106952124 A | 7/2017 |
| CN | 107451874 A | 12/2017 |
| CN | 108305106 A | 7/2018 |
| CN | 108305216 A | 7/2018 |
| CN | 108805712 A | 11/2018 |
| CN | 108830600 A | 11/2018 |
| CN | 108876572 A | 11/2018 |
| CN | 108898389 A | 11/2018 |
| CN | 108922012 A | 11/2018 |
| CN | 108961030 A | 12/2018 |
| CN | 109636414 A | 4/2019 |
| CN | 110046900 A | 7/2019 |
| CN | 110060111 A | 7/2019 |
| TW | I610261 B | 1/2018 |
| TW | M556895 U | 3/2018 |
| WO | WO-2020134614 A1 * | 7/2020 |

OTHER PUBLICATIONS

Blockchain-based Payment Collection Supervision System using Pervasive Bitcoin Digital Wallet. Chen. IEEE. (Year: 2017).*
Lelantos: A Blockchain-based Anonymous Physical Delivery System. AlTawy. IEEE. (Year: 2017).*
CN106952124. English Translation. (Year: 2017).*
Neisse et al., "A Blockchain-based Approach for Data Accountability and Provenance Tracking," ARES, 2017.
Chen et al., "Blockchain-based Payment Collection Supervision System Using Pervasive Bitcoin Digital Wallet," Fifth International Workshop on Pervasive and Context-Aware Middleware, 2017, (pp. 139-146).
AlTawy et al., "Lelantos: A Blockchain-based Anonymous Physical Delivery System," *15th Annual Conference on Privacy, Security and Trust*, 2017, (pp. 15-24).
English Translation of CN patent publication CN106952124A, Jul. 14, 2017.

* cited by examiner

Fig. 6

INVOICE ACCESS METHOD AND APPARATUS BASED ON BLOCKCHAIN, AND ELECTRONIC DEVICE

BACKGROUND

Technical Field

One or more implementations of the present specification relate to the field of blockchain technologies, and in particular, to an invoice access method and apparatus based on a blockchain, and an electronic device.

Description of the Related Art

A blockchain technology, also known as a distributed ledger technology, is an emerging technology in which several computing devices participate in "bookkeeping" and jointly maintain a complete distributed database. Because the blockchain technology is characterized by being decentralized, open and transparent, enabling each computing device to participate in database recording, and enabling data synchronization to be performed quickly between the computing devices, the blockchain technology is used to build a decentralized system, and various executable programs are stored in the distributed database of the blockchain for automatic execution, which has been widely used in many fields.

BRIEF SUMMARY

The present specification provides an invoice access method based on a blockchain, including: receiving an access request initiated by an access user for a target invoice by using a client, the target invoice being encrypted and stored in the blockchain; determining, in response to the access request, whether the access user has an authority to access the target invoice; and in response to that the access user has the authority to access the target invoice, invoking decryption logic provided in a predetermined smart contract to decrypt ciphertext data of the target invoice stored in the blockchain, and returning decrypted plaintext data of the target invoice to the client.

In some implementations, the smart contract further provides an access authority verification logic for the access user; and the determining whether the access user has the authority to access the target invoice includes: invoking the access authority verification logic provided in the smart contract to determine whether the access user has the authority to access the target invoice.

In some implementations, the method further includes: receiving a creation request initiated by a creation user for the target invoice by using a client; determining an invoice issuer and an invoice receiver of the target invoice in response to the creation request; and invoking an encryption logic provided in the smart contract, to separately encrypt plaintext data of the target invoice based on keys corresponding to the invoice issuer and the invoice receiver, and adding encrypted ciphertext data of the target invoice and user identifiers of the invoice issuer and the invoice receiver of the target invoice to the blockchain for storage.

In some implementations, the separately encrypting the plaintext data of the target invoice based on the keys corresponding to the invoice issuer and the invoice receiver includes: encrypting plaintext data of the target invoice based on a first key corresponding to the invoice issuer to obtain first ciphertext data; and encrypting the plaintext data of the target invoice based on a second key corresponding to the invoice receiver to obtain second ciphertext data; and the adding the encrypted ciphertext data of the target invoice and the user identifiers of the invoice issuer and the invoice receiver of the target invoice to the blockchain for storage includes: adding a corresponding relationship between the first ciphertext data and a user identifier of the invoice issuer to the blockchain for storage; and adding a corresponding relationship between the second ciphertext data and a user identifier of the invoice receiver to the blockchain for storage.

In some implementations, the access request includes a user identifier of the access user; and the determining whether the access user has the authority to access the target invoice includes: obtaining the user identifiers of the invoice issuer and the invoice receiver of the target invoice; determining whether the user identifier of the access user matches the user identifiers of the invoice issuer or the invoice receiver; and in response to that the user identifier of the access user matches at least one of the user identifiers of the invoice issuer or the invoice receiver, determining that the access user has the authority to access the target invoice.

In some implementations, the decrypting the ciphertext data of the target invoice stored in the blockchain includes: decrypting, based on a key corresponding to the access user, the ciphertext data of the target invoice stored in the blockchain.

In some implementations, the smart contract further provides a key distribution logic; and the method further includes: receiving a registration request initiated by a user by using a client; and invoking the key distribution logic in the smart contract in response to the registration request, and writing a corresponding relationship between a user identifier of the user and a key distributed to the user into the smart contract.

In some implementations, the invoice identifier is a taxpayer identification number.

The present specification further provides an invoice access apparatus based on a blockchain, including: a first receiving module, configured to receive an access request initiated by an access user for a target invoice by using a client, the target invoice being encrypted and stored in the blockchain; a first determining module, configured to determine, in response to the access request, whether the access user has an authority to access the target invoice; and a decryption module, configured to: when the access user has the authority to access the target invoice, invoke decryption logic provided in a predetermined smart contract to decrypt ciphertext data of the target invoice stored in the blockchain, and return decrypted plaintext data of the target invoice to the client.

In some implementations, the smart contract further provides an access authority verification logic for the access user; and the first determining module is specifically configured to: invoke the access authority verification logic provided in the smart contract to determine whether the access user has the authority to access the target invoice.

In some implementations, the apparatus further includes: a second receiving module, configured to receive a creation request initiated by a creation user for the target invoice by using a client; a second determining module, configured to determine an invoice issuer and an invoice receiver of the target invoice in response to the creation request; and an encryption module, configured to invoke an encryption logic provided in the smart contract, to separately encrypt plaintext data of the target invoice based on keys corresponding to the invoice issuer and the invoice receiver, and add encrypted ciphertext data of the target invoice and user identifiers of the invoice issuer and the invoice receiver of the target invoice to the blockchain for storage.

In some implementations, the encryption module is specifically configured to: encrypt plaintext data of the target invoice based on a first key corresponding to the invoice issuer to obtain first ciphertext data; and encrypt the plaintext data of the target invoice based on a second key corresponding to the invoice receiver to obtain second ciphertext data; and the adding the encrypted ciphertext data of the target invoice and the user identifiers of the invoice issuer and the invoice receiver of the target invoice to the blockchain for storage includes: adding a corresponding relationship between the first ciphertext data and a user identifier of the invoice issuer to the blockchain for storage; and adding a corresponding relationship between the second ciphertext data and a user identifier of the invoice receiver to the blockchain for storage.

In some implementations, the access request includes a user identifier of the access user; and the first determining module is specifically configured to: obtain the user identifiers of the invoice issuer and the invoice receiver of the target invoice; determine whether the user identifier of the access user matches the user identifiers of the invoice issuer or the invoice receiver; and in response to that the user identifier of the access user matches at least one of the user identifiers of the invoice issuer or the invoice receiver, determine that the access user has the authority to access the target invoice.

In some implementations, the decryption module is specifically configured to: decrypt, based on a key corresponding to the access user, the ciphertext data of the target invoice stored in the blockchain.

In some implementations, the smart contract further provides a key distribution logic; and the apparatus further includes: a third receiving module, configured to receive a registration request initiated by a user by using a client; and a registration module, configured to invoke the key distribution logic in the smart contract in response to the registration request, and write a corresponding relationship between a user identifier of the user and a key distributed to the user into the smart contract.

In some implementations, the invoice identifier is a taxpayer identification number.

The present specification further provides an electronic device, including: a processor; and a memory configured to store machine-executable instructions; where by reading and executing the machine-executable instructions that are stored in the memory and correspond to control logic for invoice access based on a blockchain, the processor is enabled to: receive an access request initiated by an access user for a target invoice by using a client, the target invoice being encrypted and stored in the blockchain; determine, in response to the access request, whether the access user has an authority to access the target invoice; and in response to that the access user has the authority to access the target invoice, invoke decryption logic provided in a predetermined smart contract to decrypt ciphertext data of the target invoice stored in the blockchain, and return decrypted plaintext data of the target invoice to the client.

In the above technical solutions, when a user needs to access an invoice encrypted and stored in a blockchain, access authority of the user can be verified by invoking corresponding logic in a smart contract deployed in the blockchain, and the user is allowed to access the invoice when it is determined that the user has the authority to access the invoice. As such, data security of invoices circulating in the blockchain can be ensured, and potential safety hazards caused by invoice data leakage are avoided.

DETAILED DESCRIPTION

Example implementations are described in detail herein, and examples thereof are shown in the accompanying drawings. When the following description refers to the accompanying drawings, unless otherwise indicated, the same numbers in different accompanying drawings refer to the same or similar elements. The following example implementations do not represent all implementations consistent with one or more implementations of the present specification. In contrast, they are merely examples of apparatuses and methods consistent with some aspects of one or more implementations of the present specification as described in detail in the appended claims.

Terms used in the present specification are for the purpose of describing example implementations only and are not intended to limit the present specification. As used in the present specification and the appended claims, the singular forms "a (an)," "the" and "this" are also intended to include the plural forms, unless the context clearly indicates other meaning. It should also be understood that the term "and/or" as used herein refers to and includes any or all possible combinations of one or more associated listed items.

It should be understood that although the terms such as "first," "second," and "third" can be used to describe various types of information in the present specification, the information should not be limited to these terms. These terms are only used to differentiate information of a same type. For example, without departing from the scope of the present specification, the first information can also be called second information, and similarly, the second information can also be called first information. Depending on the context, the word "if" as used herein can be explained as "when" or "in response to determining."

The present specification provides technical solutions in which when a user needs to access an invoice encrypted and stored in a blockchain, access authority of the user is verified by invoking corresponding logic in a smart contract deployed in a blockchain network of the blockchain, and the user is allowed to access the invoice when it is determined that the user has the authority to access the invoice.

In example implementations, invoices are usually encrypted and stored in a blockchain, that is, invoices are usually stored in the blockchain in the form of ciphertext. When a user needs to access a certain invoice stored in the blockchain, the user can initiate a request for access to the invoice by using a client.

After receiving the access request, a node device in the blockchain network can respond to the access request.

Specifically, it can be determined first whether the user has authority to access the invoice. Usually only an invoice issuer and an invoice receiver of a certain invoice are allowed to access the invoice, and other users are not allowed to access the invoice, so as to ensure the data security of the invoice and avoid leakage of invoice data. In this case, it can be first determined whether the user is the invoice issuer or invoice receiver of the invoice. In response to that the user is the invoice issuer or invoice receiver of the invoice, it can be determined that the user has the authority to access the invoice.

After it is determined that the user has the authority to access the invoice, the node device can invoke decryption logic provided, e.g., declared, in a smart contract deployed in the blockchain to decrypt ciphertext data of the invoice stored in the blockchain, to obtain plaintext data of the invoice.

After obtaining the plaintext data of the invoice, the node device can return the plaintext data of the invoice to the client, so that the client can perform subsequent service processing based on the plaintext data of the invoice. For example, the client can show the plaintext data of the invoice to the access user for viewing.

In the above technical solutions, when a user needs to access an invoice encrypted and stored in a blockchain, access authority of the user can be verified by invoking corresponding logic in a smart contract deployed in the blockchain, and the user is allowed to access the invoice when it is determined that the user has the authority to access the invoice. As such, data security of invoices circulating in the blockchain can be ensured, and potential safety hazards caused by invoice data leakage are avoided.

The present specification is further described below with reference to example implementations.

Figure 1:
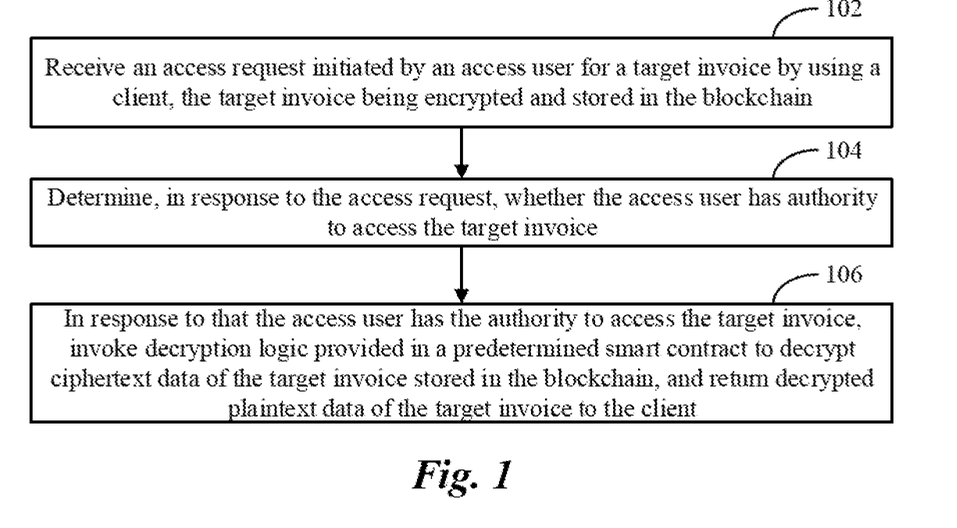
FIG. 1 is a flowchart illustrating an invoice access method based on a blockchain according to some example implementations of the present specification.

FIG. 1 is a flowchart illustrating an invoice access method based on a blockchain according to some example implementations of the present specification. The method can be applied at a node device in a blockchain network, and includes the following steps.

Step 102: Receive an access request initiated by an access user for a target invoice by using a client, the target invoice being encrypted and stored in the blockchain.

Step 104: Determine, in response to the access request, whether the access user has an authority to access the target invoice.

Step 106: In response to that the access user has the authority to access the target invoice, invoke decryption logic provided in a predetermined smart contract to decrypt ciphertext data of the target invoice stored in the blockchain, and return decrypted plaintext data of the target invoice to the client.

The blockchain network described in the present specification can include any type of blockchain network. For example, in practice, any one of a public blockchain network, a private blockchain network, and a consortium blockchain network can be used.

In the implementations, invoices can be encrypted and stored in a blockchain, that is, invoices are usually stored in the blockchain in the form of ciphertext.

When an access user needs to access a target invoice stored in the blockchain, the access user can initiate, by using a client, a transaction for accessing the invoice, i.e., initiate a request for access to the invoice by using the client.

Transactions in the blockchain are divided into transactions in narrow meanings and transactions in broad meanings. A transaction in narrow meanings refers to a value transfer added by a user to the blockchain. For example, in a conventional bitcoin blockchain network, a transaction can be a transfer initiated by a user in the blockchain. A transaction in broad meanings refers to a piece of service or business data with a service or business intention added by a user to the blockchain. For example, the operator can build a consortium blockchain based on actual service requirements, and deploy, based on the consortium blockchain, some other online services unrelated to value transfer (such as a rental service, a vehicle dispatching service, an insurance claims service, a credit service, and a medical service). In this consortium blockchain, the transaction can be a service/business message or service/business request with a service/business intention added by the user in the consortium blockchain.

It should be noted that the user can be an individual or an enterprise, which does not limit the scope of the present specification.

After receiving the access request, a node device in the blockchain can respond to the access request.

For example, it can be determined first whether the access user has an authority to access the target invoice.

After it is determined that the access user has the authority to access the target invoice, decryption logic provided in a smart contract deployed in the blockchain can be invoked to decrypt ciphertext data of the target invoice stored in the blockchain, so as to obtain plaintext data of the target invoice.

The decryption logic can be, for example, program code (such as some program methods or functions that can be invoked) that is provided in the smart contract and related to execution logic for decrypting ciphertext data of an invoice.

After the plaintext data of the target invoice is decrypted, the plaintext data of the target invoice can be returned to the client, so that the client can perform subsequent service processing based on the plaintext data of the target invoice. For example, the client can sort out the plaintext data of the target invoice based on the standard format of an invoice, and show the sorted target invoice to the access user for viewing.

In practice, the smart contract can further provide an access authority verification logic for the access user. In this case, the access authority verification logic in the smart contract can be invoked to determine whether the access user has an authority to access the target invoice.

The access authority verification logic can be, for example, program code that is provided in the smart contract and related to execution logic for verifying access authority of an access user.

Figure 2:
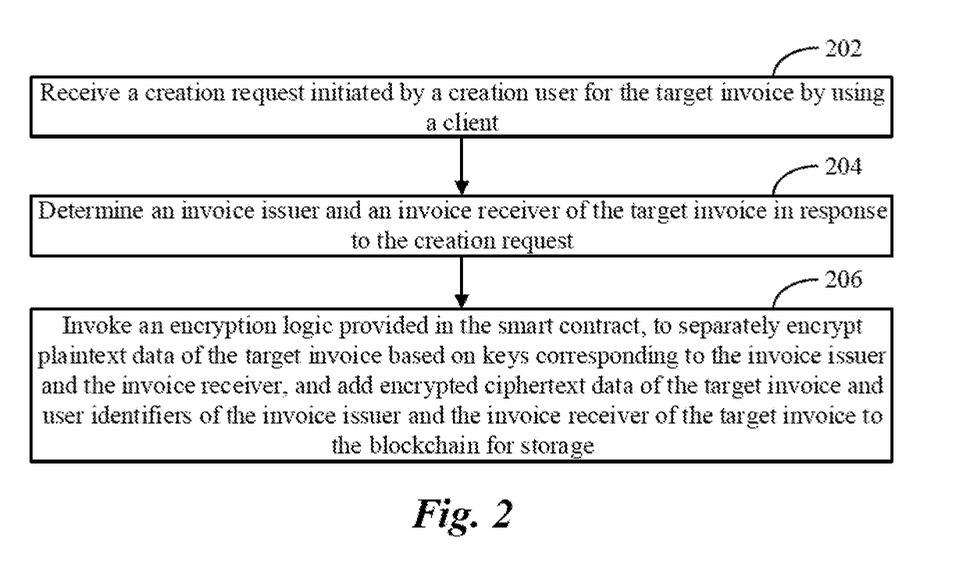
FIG. 2 is a flowchart illustrating another invoice access method based on a blockchain according to some example implementations of the present specification.

In addition, referring to FIG. 2, the following steps can be performed to encrypt a target invoice and then store the encrypted target invoice in a blockchain.

Step 202: Receive a creation request initiated by a creation user for the target invoice by using a client.

Step 204: Determine an invoice issuer and an invoice receiver of the target invoice in response to the creation request.

Step 206: Invoke an encryption logic provided in the smart contract, to separately encrypt plaintext data of the target invoice based on keys corresponding to the invoice issuer and the invoice receiver, and add encrypted ciphertext data of the target invoice and user identifiers of the invoice issuer and the invoice receiver of the target invoice to the blockchain for storage.

In the implementations, the creation user can initiate the creation request for the above target invoice by using a client.

After receiving the creation request, the node device in the blockchain can first determine an invoice issuer and an invoice receiver of the target invoice in response to the creation request. In practice, the invoice issuer of the target invoice is usually the creation user.

After the invoice issuer and the invoice receiver of the target invoice are determined, encryption logic provided in a smart contract deployed in the blockchain can be invoked to decrypt plaintext data of the target invoice based on keys corresponding to the invoice issuer and the invoice receiver, so as to obtain ciphertext data of the target invoice.

The encryption logic can be, for example, program code that is provided in the smart contract and related to execution logic for encrypting plaintext data of an invoice.

After ciphertext data of the target invoice is encrypted, the ciphertext data of the target invoice and user identifiers of the invoice issuer and the invoice receiver of the target invoice can be added to the blockchain for storage. The user identifier can be, for example, a taxpayer identification number.

For example, the ciphertext data of the target invoice and the user identifiers of the invoice issuer and the invoice receiver of the target invoice can be sent to a node device in the blockchain. After receiving the ciphertext data and the user identifiers, the node device in the blockchain can initiate consensus on the ciphertext data and the user identifiers, and store the ciphertext data and the user identifiers after the consensus is passed, so that the ciphertext data and the user identifiers are added to the blockchain for storage.

It should be noted that the smart contract for decrypting ciphertext data of an invoice stored in the blockchain and the smart contract for encrypting the plaintext data of the invoice and adding the encrypted plaintext data to the blockchain for storage can be integrated into one smart contract and deployed in the blockchain network, or can be deployed in the blockchain network as two different smart contracts, which does not limit the scope of the present specification.

In practice, the above smart contract can further provide user identity verification logic for the target invoice. In this case, the user identity verification logic in the smart contract can be invoked to determine the invoice issuer and the invoice receiver of the target invoice.

The user identity verification logic can be, for example, code that is provided in the smart contract and related to execution logic for determining the invoice issuer and the invoice receiver of the invoice.

For example, the creation request can include the user identifiers of the invoice issuer and the invoice receiver that is input by the creation user during creation of the target invoice, that is, the user identifier of the invoice issuer provided by the creation user can be determined as the user identifier of the invoice issuer of the target invoice, and the user identifier of the invoice receiver provided by the creation user can be determined as the user identifier of the invoice receiver of the target invoice, so that the invoice issuer and the invoice receiver of the target invoice are determined.

In some illustration implementations, to encrypt the plaintext data of the target invoice, on the one hand, the plaintext data of the target invoice can be encrypted based on the key corresponding to the invoice issuer, to obtain ciphertext data (called first ciphertext data) of the target invoice corresponding to the invoice issuer; on the other hand, the plaintext data of the target invoice can be encrypted based on the key corresponding to the invoice receiver, to obtain ciphertext data (called second ciphertext data) of the target invoice corresponding to the invoice receiver.

Subsequently, a corresponding relationship between the first ciphertext data and the user identifier of the invoice issuer can be added to the blockchain for storage, and a corresponding relationship between the second ciphertext data and the user identifier of the invoice receiver can be added to the blockchain for storage.

For example, the storage form of the ciphertext data of the target invoice can be shown in Table 1:

TABLE 1

| Ciphertext data 1 | User identifier 1 | Ciphertext data 2 | User identifier 2 |
| --- | --- | --- | --- |

In Table 1, ciphertext data 1 is the ciphertext data of the target invoice corresponding to the invoice issuer, e.g., the first ciphertext data, and user identifier 1 is the user identifier of the invoice issuer; and ciphertext data 2 is the ciphertext data of the target invoice corresponding to the invoice receiver, e.g., the second ciphertext data, and user identifier 2 is the user identifier of the invoice receiver.

With reference to the implementation shown in FIG. 2 and continuing to refer to FIG. 1, in some illustrated implementations, the access request initiated by the access user for the target invoice by using the client can include the user identifier of the access user.

In this case, to determine whether the access user has the authority to access the target invoice, the user identifiers of the invoice issuer and the invoice receiver of the target invoice can be obtained first.

After the user identifiers of the invoice issuer and the invoice receiver are obtained, on the one hand, the user identifier of the access user can be compared with the user identifier of the invoice issuer; and on the other hand, the user identifier of the access user can be compared with the user identifier of the invoice receiver, so as to determine whether the user identifier of the access user matches the user identifiers of the invoice issuer or the invoice receiver.

In response to that the user identifier of the access user matches at least one of the user identifiers of the invoice issuer or the invoice receiver, it can be determined that the access user has the authority to access the target invoice. For example, in response to that the user identifier of the access user is the same as the user identifier of the invoice issuer, it means that the access user is the invoice issuer of the target invoice and has the authority to access the target invoice; and in response to that the user identifier of the access user is the same as the user identifier of the invoice receiver, it means that the access user is the invoice receiver of the target invoice and also has the authority to access the target invoice.

After it is determined that the access user has the authority to access the target invoice, the ciphertext data of the target invoice stored in the blockchain can be decrypted based on the key corresponding to the access user, so as to obtain plaintext data of the target invoice.

In practice, the smart contract can further provide key distribution logic for a user. In this case, any user can initiate a registration request by using a client.

The key distribution logic can be, for example, program code that is provided in the smart contract and related to execution logic for distributing keys to users.

After receiving the registration request, a node device in the blockchain can invoke, in response to the registration request, the key distribution logic in the smart contract to distribute a key to the user, and write a corresponding relationship between a user identifier (which can usually be included in the registration request) of the user and the key distributed to the user into the smart contract.

That is, the corresponding relationship shown in Table 2 can be stored in the smart contract:

TABLE 2

| User identifier 1 | Key 1 |
| User identifier 2 | Key 2 |
| User identifier 3 | Key 3 |
| ... | ... |

In Table 2, assuming that user identifier 1 is the user identifier of user 1, the key corresponding to user 1 is key 1; assuming that user identifier 2 is the user identifier of user 2, the key corresponding to user 2 is key 2; and so on.

The present specification is described below by taking an invoice issued by enterprise A to enterprise B as an example.

First, enterprise A and enterprise B can separately initiate registration requests by using their clients.

After receiving the registration requests, a node device in a blockchain can invoke, in response to the registration requests, key distribution logic in a smart contract deployed in the blockchain to distribute keys to enterprise A and enterprise B respectively.

Assuming that the user identifier of enterprise A is tax identification number A, and the key distributed to enterprise A is key A; the user identifier of enterprise B is tax identification number B, and the key distributed to enterprise B is key B, then the corresponding relationship between user identifiers and keys shown in Table 3 can be stored in the smart contract deployed in the blockchain:

TABLE 3

| Tax identification number A | Key A |
| Tax identification number B | Key B |
| ... | ... |

When enterprise A issues an invoice to enterprise B, enterprise A can initiate a creation request for the invoice by using a client.

After receiving the creation request, a node device in the blockchain can determine, in response to the creation request, the invoice issuer of the invoice as enterprise A (whose user identifier is tax identification number A), and the invoice receiver of the invoice as enterprise B (whose user identifier is tax identification number B).

After the invoice issuer and the invoice receiver of the invoice are determined, on the one hand, key A corresponding to enterprise A can be determined based on tax identification number A of enterprise A (invoice issuer), and plaintext data of the invoice can be encrypted based on key A to obtain ciphertext data A of the invoice corresponding to enterprise A; on the other hand, key B corresponding to enterprise B can be determined based on tax identification number B of enterprise B (invoice receiver), and the plaintext data of the invoice can be encrypted based on key B to obtain ciphertext data B of the invoice corresponding to enterprise B.

Subsequently, the ciphertext data (ciphertext data A and ciphertext data B) of the invoice and the user identifiers (tax identification number A and tax identification number B) of the invoice issuer and invoice receiver of the invoice can be added to the blockchain for storage in the storage form shown in Table 4:

TABLE 4

| Ciphertext data A | Tax identification number A | Ciphertext data B | Tax identification number B |
| --- | --- | --- | --- |

When enterprise B needs to access the invoice, enterprise B can initiate an access request for the invoice by using a client. The access request can include tax identification number B.

After receiving the access request, the node device in the blockchain can first determine, in response to the access request, user identifiers of the invoice issuer and the invoice receiver of the invoice as tax identification number A and tax identification number B respectively. Subsequently, it can be determined whether the user identifier (tax identification number B) of enterprise B matches the user identifiers (tax identification number A and tax identification number B) of the invoice issuer and invoice receiver of the invoice.

Because the user identifier of enterprise B is the user identifier of the invoice receiver of the invoice, that is, enterprise B is the invoice receiver of the invoice, it can be determined that the user identifier of enterprise B matches the user identifier of the invoice receiver of the invoice, and thus it can be determined that enterprise B has the authority to access the target invoice.

Subsequently, key B corresponding to enterprise B can be determined based on tax identification number B of enterprise B, the ciphertext data of the invoice can be decrypted based on key B to obtain the plaintext data of the invoice, and the plaintext data of the invoice can be returned to the client used by enterprise B.

In the above technical solutions, when a user needs to access an invoice encrypted and stored in a blockchain, access authority of the user can be verified by invoking corresponding logic in a smart contract deployed in the blockchain, and the user is allowed to access the invoice when it is determined that the user has the authority to access the invoice. As such, data security of invoices circulating in the blockchain can be ensured, and potential safety hazards caused by invoice data leakage are avoided.

Corresponding to the above implementations of the invoice access method based on a blockchain, the present specification further provides implementations of the invoice access apparatus based on a blockchain.

Figure 3:
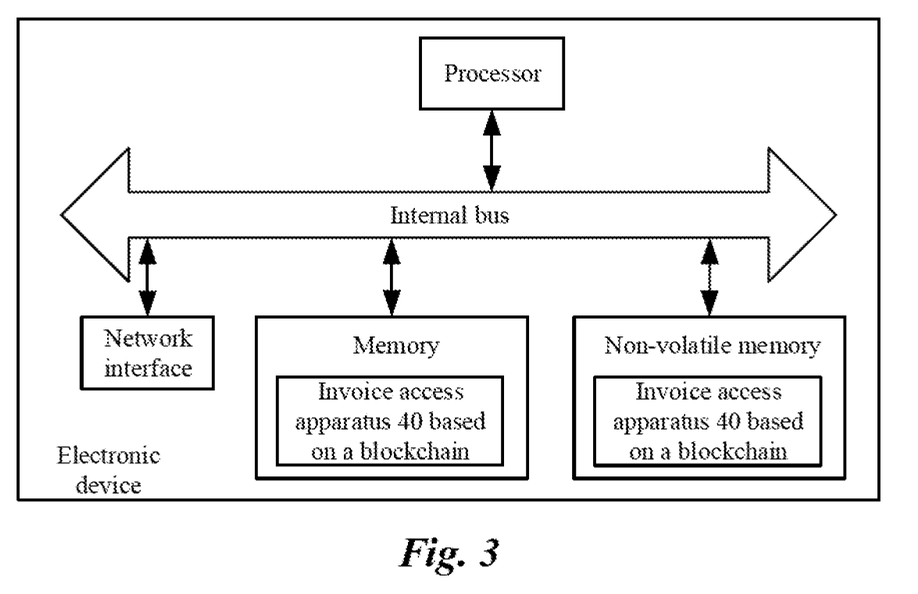
FIG. 3 is a diagram illustrating a hardware structure of an electronic device where an invoice access apparatus based on a blockchain is located according to some example implementations of the present specification.

The implementations of the invoice access apparatus based on a blockchain according to the present specification can be applied to an electronic device. The apparatus implementations can be implemented by using software, hardware, or a combination thereof. Taking software implementation as an example, a logical apparatus is implemented by reading, by using a processor of an apparatus device where the apparatus is located, corresponding computer program instructions in a non-volatile memory into a memory for running. On the hardware level, FIG. 3 is a diagram illustrating a hardware structure of an electronic device where an invoice access apparatus based on a blockchain is located according to the present specification. In addition to a processor, a memory, a network interface, and a non-volatile memory shown in FIG. 3, the electronic device where the apparatus is located according to the implementation can generally further include other hardware on the basis of the actual invoice access function based on the blockchain, and details are omitted for simplicity.

Figure 4:
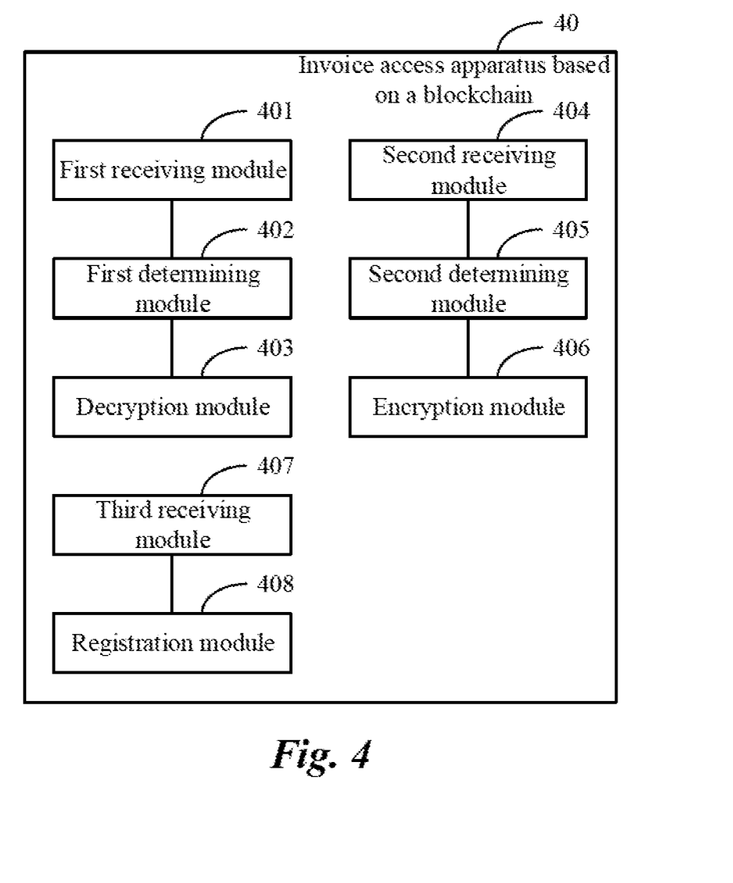
FIG. 4 is a block diagram illustrating an invoice access apparatus based on a blockchain according to some example implementations of the present specification.

FIG. 4 is a block diagram illustrating an invoice access apparatus based on a blockchain according to some example implementations of the present specification. The apparatus 40 can be applied to the electronic device shown in FIG. 3, and includes: a first receiving module 401, configured to receive an access request initiated by an access user for a target invoice by using a client, the target invoice being encrypted and stored in the blockchain; a first determining module 402, configured to determine, in response to the access request, whether the access user has an authority to access the target invoice; and a decryption module 403, configured to: when the access user has an authority to access the target invoice, invoke decryption logic provided in a predetermined smart contract to decrypt ciphertext data of the target invoice stored in the blockchain, and return decrypted plaintext data of the target invoice to the client.

In the implementations, the smart contract can further provide an access authority verification logic for the access user; and the first determining module 402 can be specifically configured to: invoke the access authority verification logic provided in the smart contract to determine whether the access user has an authority to access the target invoice.

In the implementations, the apparatus 40 can further include: a second receiving module 404, configured to receive a creation request initiated by a creation user for the target invoice by using a client; a second determining module 405, configured to determine an invoice issuer and an invoice receiver of the target invoice in response to the creation request; and an encryption module 406, configured to invoke an encryption logic provided in the smart contract, to separately encrypt plaintext data of the target invoice based on keys corresponding to the invoice issuer and the invoice receiver, and add encrypted ciphertext data of the target invoice and user identifiers of the invoice issuer and the invoice receiver of the target invoice to the blockchain for storage.

In the implementations, the encryption module 406 can be specifically configured to: encrypt plaintext data of the target invoice based on a first key corresponding to the invoice issuer to obtain first ciphertext data; and encrypt the plaintext data of the target invoice based on a second key corresponding to the invoice receiver to obtain second ciphertext data; and the adding the encrypted ciphertext data of the target invoice and the user identifiers of the invoice issuer and the invoice receiver of the target invoice to the blockchain for storage includes: adding a corresponding relationship between the first ciphertext data and a user identifier of the invoice issuer to the blockchain for storage; and adding a corresponding relationship between the second ciphertext data and a user identifier of the invoice receiver to the blockchain for storage.

In the implementations, the access request can include a user identifier of the access user; and the first determining module 402 can be specifically configured to: obtain the user identifiers of the invoice issuer and the invoice receiver of the target invoice; determine whether the user identifier of the access user matches the user identifiers of the invoice issuer or the invoice receiver; and in response to that the user identifier of the access user matches at least one of the user identifiers of the invoice issuer or the invoice receiver, determine that the access user has the authority to access the target invoice.

In the implementations, the decryption module 403 can be specifically configured to: decrypt, based on a key corresponding to the access user, the ciphertext data of the target invoice stored in the blockchain.

In the implementations, the smart contract can further provide key distribution logic; and the apparatus 40 can further include: a third receiving module 407, configured to receive a registration request initiated by a user by using a client; and a registration module 408, configured to invoke the key distribution logic in the smart contract in response to the registration request, and write a corresponding relationship between a user identifier of the user and a key distributed to the user into the smart contract.

In the implementations, the invoice identifier can be a taxpayer identification number.

The implementation process of functions of each module in the above apparatus is detailed in the implementation process of the corresponding steps in the above method. Details are omitted herein for simplicity.

Because the apparatus implementations basically correspond to the method implementations, for related parts, references can be made to partial description of the method implementation. The apparatus implementations described above are merely illustrative, where modules described as separate components can or cannot be physically separated. Components displayed as modules can or cannot be physical modules, that is, the components can be located in one place, or can be distributed to multiple network modules. Some or all of the modules can be selected based on actual needs to achieve the object of the solution of the present specification. A person of ordinary skill in the art can understand and implement the implementations without innovative efforts.

The systems, apparatuses, or modules illustrated in the above implementations can be specifically implemented by computer chips or entities, or by products with certain functions. A typical implementation device is a computer. The computer can be a personal computer, a laptop computer, a cellular phone, a camera phone, a smartphone, a personal digital assistant, a media player, a navigation device, an email sending and receiving device, a game console, a tablet computer, a wearable device, or a combination thereof.

Corresponding to the above implementations of the invoice access method based on a blockchain, the present specification further provides implementations of an electronic device. The electronic device includes a processor and a memory configured to store machine-executable instructions, where the processor and the memory are usually connected to each other by using an internal bus. In other possible implementations, the device can further include an external interface that can be communicated with other devices or components.

In the implementations, by reading and executing the machine-executable instructions that are stored in the memory and correspond to control logic for invoice access based on a blockchain, the processor is enabled to: receive an access request initiated by an access user for a target invoice by using a client, the target invoice being encrypted and stored in the blockchain; determine, in response to the access request, whether the access user has an authority to access the target invoice; and in response to that the access user has the authority to access the target invoice, invoke decryption logic declared in a predetermined smart contract to decrypt ciphertext data of the target invoice stored in the blockchain, and return decrypted plaintext data of the target invoice to the client.

In the implementations, the smart contract can further provide an access authority verification logic for the access user; and by reading and executing the machine-executable instructions that are stored in the memory and correspond to control logic for invoice access based on a blockchain, the processor is enabled to: invoke the access authority verification logic declared in the smart contract to determine whether the access user has an authority to access the target invoice.

In the implementations, by reading and executing the machine-executable instructions that are stored in the memory and correspond to control logic for invoice access based on a blockchain, the processor is further enabled to: receive a creation request initiated by a creation user for the target invoice by using a client; determine an invoice issuer and an invoice receiver of the target invoice in response to the creation request; and invoke an encryption logic declared in the smart contract, to separately encrypt plaintext data of the target invoice based on keys corresponding to the invoice issuer and the invoice receiver, and add encrypted ciphertext data of the target invoice and user identifiers of the invoice issuer and the invoice receiver of the target invoice to the blockchain for storage.

In the implementations, by reading and executing the machine-executable instructions that are stored in the memory and correspond to control logic for invoice access based on a blockchain, the processor is enabled to: encrypt plaintext data of the target invoice based on a first key corresponding to the invoice issuer to obtain first ciphertext data; and encrypt the plaintext data of the target invoice based on a second key corresponding to the invoice receiver to obtain second ciphertext data; and the adding the encrypted ciphertext data of the target invoice and the user identifiers of the invoice issuer and the invoice receiver of the target invoice to the blockchain for storage includes: adding a corresponding relationship between the first ciphertext data and a user identifier of the invoice issuer to the blockchain for storage; and adding a corresponding relationship between the second ciphertext data and a user identifier of the invoice receiver to the blockchain for storage.

In the implementations, the access request can include a user identifier of the access user; and by reading and executing the machine-executable instructions that are stored in the memory and correspond to control logic for invoice access based on a blockchain, the processor is enabled to: obtain the user identifiers of the invoice issuer and the invoice receiver of the target invoice; determine whether the user identifier of the access user matches the user identifiers of the invoice issuer or the invoice receiver; and in response to that the user identifier of the access user matches at least one of the user identifiers of the invoice issuer or the invoice receiver, determine that the access user has the authority to access the target invoice.

By reading and executing the machine-executable instructions that are stored in the memory and correspond to control logic for invoice access based on a blockchain, the processor is enabled to: decrypt, based on a key corresponding to the access user, the ciphertext data of the target invoice stored in the blockchain.

In the implementations, the smart contract can further declare key distribution logic; and by reading and executing the machine-executable instructions that are stored in the memory and correspond to control logic for invoice access based on a blockchain, the processor is further enabled to: receive a registration request initiated by a user by using a client; and invoke the key distribution logic in the smart contract in response to the registration request, and write a corresponding relationship between a user identifier of the user and a key distributed to the user into the smart contract.

In the implementations, the invoice identifier can be a taxpayer identification number.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 5:
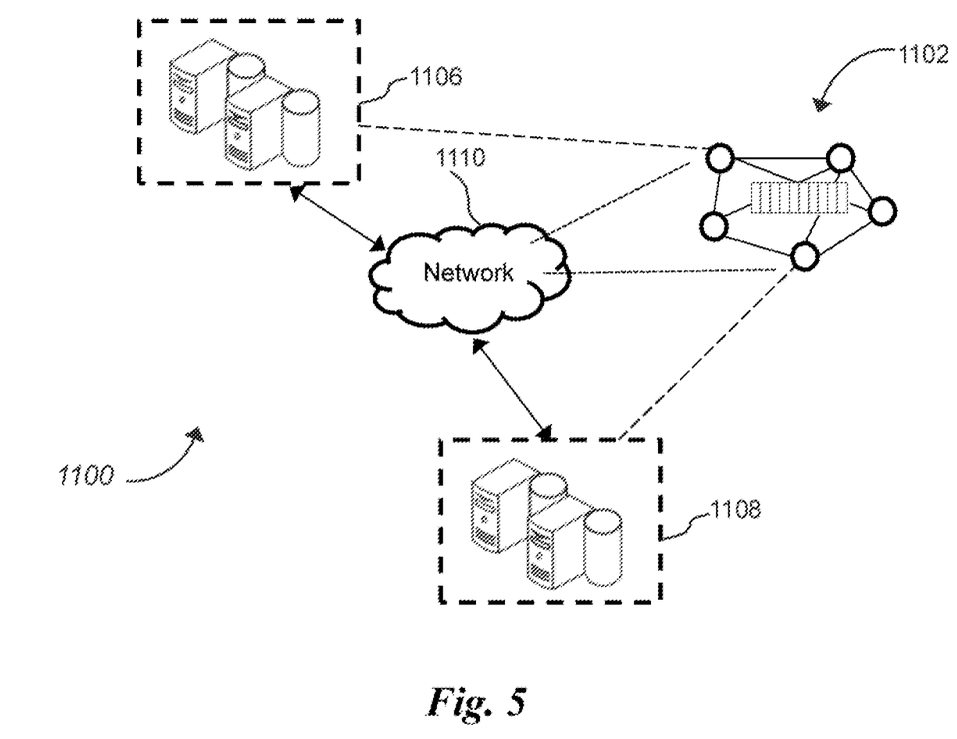
FIG. 5 is a diagram illustrating example environments that can be used to execute embodiments of this specification.

FIG. 5 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 5, the consortium blockchain network 1102 is represented as a peer-to-peer network of nodes, and the computing systems 1106, 1108 provide nodes of the first entity and second entity, respectively, which participate in the consortium blockchain network 1102.

Figure 6:
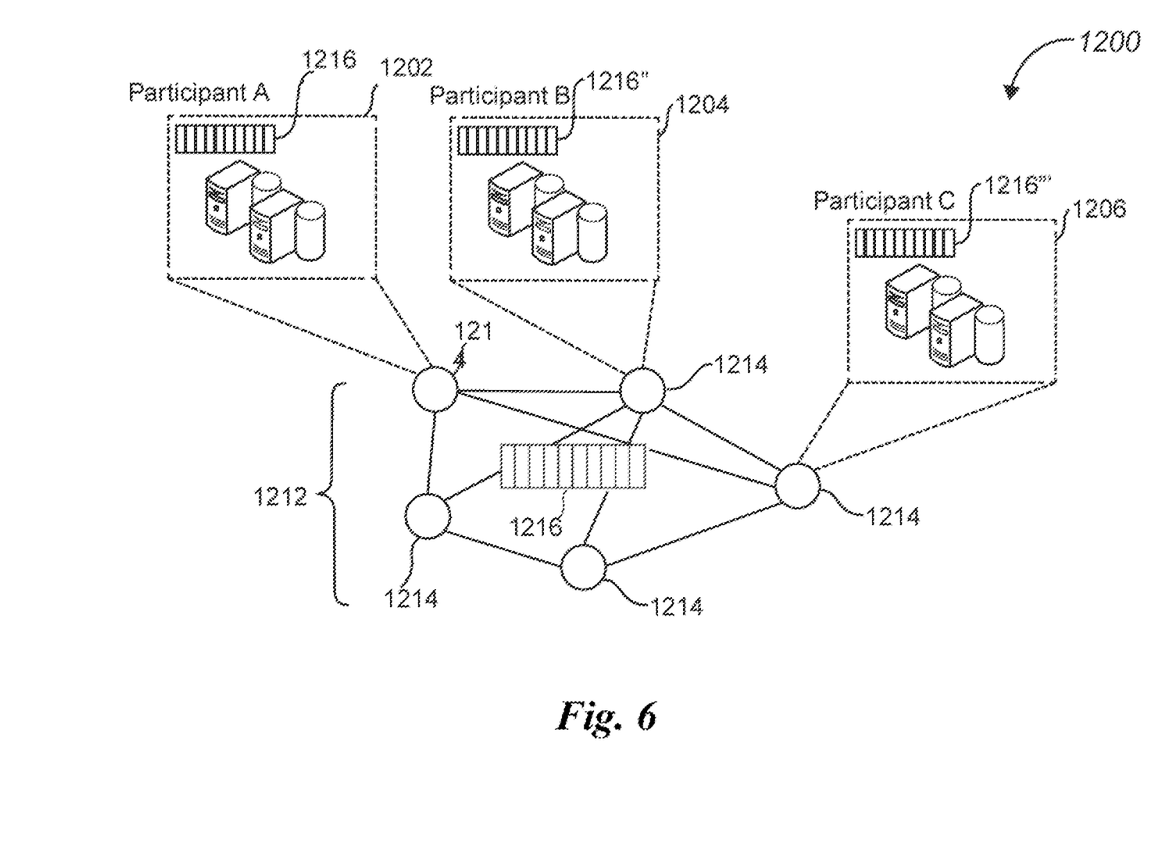
FIG. 6 is a diagram illustrating an example architecture in accordance with embodiments of this specification.

FIG. 6 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 6, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 6, the participant systems 1202, 1204 store respective, complete copies 1216', 1216", 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes." The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 6, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 6, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 6, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, a logistics management system can be implemented within the blockchain environment 1100 of FIG. 5 and using the blockchain architecture 1200 of FIG. 6. For example, transaction information of a logistic process is stored as blocks in the blockchain 1216.

A person skilled in the art will easily figure out other implementation solutions of the present specification after considering the present specification and practicing the application disclosed herein. The present specification is intended to cover any modification, use or adaptive change of the present specification, and these modifications, uses or adaptive changes follow the general principles of the present specification and include common knowledge or conventional technical means in the technical field not disclosed in the present specification. The present specification and implementations are regarded as example only, with the true scope and spirit of the present specification being indicated by the following claims.

It should be understood that the present specification is not limited to the precise structure already described above and shown in the accompanying drawings, and various modifications and changes can be performed without departing from its scope. The scope of the present specification is limited only by the appended claims.

The above descriptions are merely the preferred implementations of the present specification, and are not intended to limit the present specification. Any modifications, equivalent replacements, improvements, and the like made within the spirit and principles of the present specification should fall within the protection scope of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method based on a blockchain, comprising:
    receiving a creation request initiated by a creation user for a target invoice through a client of the creation user;
    determining an invoice issuer and an invoice receiver of the target invoice in response to the creation request;
    invoking an encryption logic provided in a smart contract to separately encrypt plaintext data of the target invoice based on keys corresponding to the invoice issuer and the invoice receiver, and adding encrypted ciphertext data of the target invoice and user identifiers of the invoice issuer and the invoice receiver of the target invoice to the blockchain;
    receiving an access request initiated by an access user for accessing the target invoice through a client of the access user;
    determining, in response to the access request, whether the access user has an authority to access the target invoice; and
    in response to the access user having the authority to access the target invoice, invoking a decryption logic provided in the smart contract to decrypt the ciphertext data of the target invoice stored in the blockchain, and returning decrypted plaintext data of the target invoice to the client.

2. The method according to claim 1, wherein:
    the smart contract provides an access authority verification logic for the access user; and
    the determining whether the access user has the authority to access the target invoice includes:
        invoking the access authority verification logic provided in the smart contract to determine whether the access user has the authority to access the target invoice.

3. The method according to claim 1, wherein the separately encrypting the plaintext data of the target invoice based on the keys corresponding to the invoice issuer and the invoice receiver includes:
    encrypting plaintext data of the target invoice based on a first key corresponding to the invoice issuer to obtain first ciphertext data;
    encrypting the plaintext data of the target invoice based on a second key corresponding to the invoice receiver to obtain second ciphertext data; and
    the adding the encrypted ciphertext data of the target invoice and the user identifiers of the invoice issuer and the invoice receiver of the target invoice to the blockchain for storage includes:
        adding a corresponding relationship between the first ciphertext data and a user identifier of the invoice issuer to the blockchain for storage; and
        adding a corresponding relationship between the second ciphertext data and a user identifier of the invoice receiver to the blockchain for storage.

4. The method according to claim 1, wherein:
    the access request includes a user identifier of the access user; and
    the determining whether the access user has the authority to access the target invoice includes:
        obtaining the user identifiers of the invoice issuer and the invoice receiver of the target invoice;
        determining whether the user identifier of the access user matches at least one of the user identifiers of the invoice issuer or the invoice receiver; and
        in response to that the user identifier of the access user matching at least one of the user identifiers of the invoice issuer or the invoice receiver, determining that the access user has the authority to access the target invoice.

5. The method according to claim 1, wherein the decrypting the ciphertext data of the target invoice stored in the blockchain includes:
    decrypting, based on a key corresponding to the access user, the ciphertext data of the target invoice stored in the blockchain.

6. The method according to claim 1, wherein:
    the smart contract further provides a key distribution logic; and
    the method comprises:
        receiving a registration request initiated by a user by using a client; and
        invoking the key distribution logic in the smart contract in response to the registration request, and writing a corresponding relationship between a user identifier of the user and a key distributed to the user into the smart contract.

7. An electronic device, comprising:
    a processor; and
    a memory storing machine-executable instructions,
    wherein by reading and executing the machine-executable instructions that are stored in the memory, the processor is enabled to implement acts including:
        receiving a creation request initiated by a creation user for a target invoice through a client of the creation user;
        determining an invoice issuer and an invoice receiver of the target invoice in response to the creation request; and
        separately encrypting plaintext data of the target invoice based on keys corresponding to the invoice issuer and the invoice receiver, and adding encrypted ciphertext data of the target invoice and user identifiers of the invoice issuer and the invoice receiver of the target invoice to a blockchain;
        receiving an access request initiated by an access user for accessing the target invoice through a client of the access user;
        determining, in response to the access request, whether the access user has an authority to access the target invoice; and
        in response to the access user having the authority to access the target invoice, decrypting the ciphertext data of the target invoice stored in the blockchain, and returning decrypted plaintext data of the target invoice to the client.

8. The electronic device according to claim 7, wherein the determining whether the access user has the authority to access the target invoice includes:
  invoking a smart contract to determine whether the access user has the authority to access the target invoice.

9. The electronic device according to claim 7, wherein the separately encrypting the plaintext data of the target invoice based on the keys corresponding to the invoice issuer and the invoice receiver includes:
  encrypting plaintext data of the target invoice based on a first key corresponding to the invoice issuer to obtain first ciphertext data;
  encrypting the plaintext data of the target invoice based on a second key corresponding to the invoice receiver to obtain second ciphertext data; and
  the adding the encrypted ciphertext data of the target invoice and the user identifiers of the invoice issuer and the invoice receiver of the target invoice to the blockchain for storage includes:
    adding a corresponding relationship between the first ciphertext data and a user identifier of the invoice issuer to the blockchain for storage; and
    adding a corresponding relationship between the second ciphertext data and a user identifier of the invoice receiver to the blockchain for storage.

10. The electronic device according to claim 7, wherein:
  the access request includes a user identifier of the access user; and
  the determining whether the access user has the authority to access the target invoice includes:
    obtaining the user identifiers of the invoice issuer and the invoice receiver of the target invoice;
    determining whether the user identifier of the access user matches at least one of the user identifiers of the invoice issuer or the invoice receiver; and
    in response to the user identifier of the access user matching at least one of the user identifiers of the invoice issuer or the invoice receiver, determining that the access user has the authority to access the target invoice.

11. The electronic device according to claim 7, wherein the decrypting the ciphertext data of the target invoice stored in the blockchain includes:
  decrypting, based on a key corresponding to the access user, the ciphertext data of the target invoice stored in the blockchain.

12. The electronic device according to claim 7, wherein: the acts include:
  receiving a registration request initiated by a user by using a client; and
  in response to the registration request, invoking a smart contract to distribute a key to the user and writing a corresponding relationship between a user identifier of the user and the key distributed to the user into the smart contract.

13. A non-transitory computer-readable storage medium storing computer-executable instructions, which when executed by a processor, configure the processor to implement acts including:
  receiving a creation request initiated by a creation user for a target invoice through a client of the creation user;
  determining an invoice issuer and an invoice receiver of the target invoice in response to the creation request; and
  invoking an encryption logic provided in a smart contract to separately encrypt plaintext data of the target invoice based on keys corresponding to the invoice issuer and the invoice receiver, and adding encrypted ciphertext data of the target invoice and user identifiers of the invoice issuer and the invoice receiver of the target invoice to a blockchain;
  receiving an access request initiated by an access user for accessing the target invoice through a client of the access user;
  determining, in response to the access request, whether the access user has an authority to access the target invoice; and
  in response to the access user having the authority to access the target invoice, invoking a decryption logic provided in the smart contract to decrypt the ciphertext data of the target invoice stored in the blockchain, and returning decrypted plaintext data of the target invoice to the client.

14. The non-transitory computer-readable storage medium according to claim 13, wherein:
  the smart contract provides an access authority verification logic for the access user; and
  the determining whether the access user has the authority to access the target invoice includes:
    invoking the access authority verification logic provided in the smart contract to determine whether the access user has the authority to access the target invoice.

15. The non-transitory computer-readable storage medium according to claim 13, wherein the separately encrypting the plaintext data of the target invoice based on the keys corresponding to the invoice issuer and the invoice receiver includes:
  encrypting plaintext data of the target invoice based on a first key corresponding to the invoice issuer to obtain first ciphertext data;
  encrypting the plaintext data of the target invoice based on a second key corresponding to the invoice receiver to obtain second ciphertext data; and
  the adding the encrypted ciphertext data of the target invoice and the user identifiers of the invoice issuer and the invoice receiver of the target invoice to the blockchain for storage includes:
    adding a corresponding relationship between the first ciphertext data and a user identifier of the invoice issuer to the blockchain for storage; and
    adding a corresponding relationship between the second ciphertext data and a user identifier of the invoice receiver to the blockchain for storage.

16. The non-transitory computer-readable storage medium according to claim 13, wherein:
  the access request includes a user identifier of the access user; and
  the determining whether the access user has the authority to access the target invoice includes:
    obtaining the user identifiers of the invoice issuer and the invoice receiver of the target invoice;
    determining whether the user identifier of the access user matches at least one of the user identifiers of the invoice issuer or the invoice receiver; and
    in response to the user identifier of the access user matching at least one of the user identifiers of the invoice issuer or the invoice receiver, determining that the access user has the authority to access the target invoice.

17. The non-transitory computer-readable storage medium according to claim 13, wherein the decrypting the ciphertext data of the target invoice stored in the blockchain includes:
- decrypting, based on a key corresponding to the access user, the ciphertext data of the target invoice stored in the blockchain.

18. The non-transitory computer-readable storage medium according to claim 13, wherein:
- the smart contract further provides a key distribution logic; and
- the acts include:
  - receiving a registration request initiated by a user by using a client; and
  - invoking the key distribution logic in the smart contract in response to the registration request, and writing a corresponding relationship between a user identifier of the user and a key distributed to the user into the smart contract.

\* \* \* \* \*

UNITED STATES PATENT AND TRADEMARK OFFICE
CERTIFICATE OF CORRECTION

PATENT NO. : 11,126,739 B2
APPLICATION NO. : 17/160254
DATED : September 21, 2021
INVENTOR(S) : Hansong Xiao et al.

Page 1 of 1

It is certified that error appears in the above-identified patent and that said Letters Patent is hereby corrected as shown below:

In the Claims

Column 20, Claim 4, Line 17:
"in response to that the user identifier" should read: --in response to the user identifier--.

Signed and Sealed this
Fifteenth Day of November, 2022

Katherine Kelly Vidal
*Director of the United States Patent and Trademark Office*